(12) United States Patent
Christensen

(10) Patent No.: US 7,693,750 B2
(45) Date of Patent: Apr. 6, 2010

(54) METHOD AND SYSTEM FOR AGGREGATING, STANDARDIZING AND PRESENTING PURCHASE INFORMATION FROM SHOPPERS AND SELLERS TO FACILITATE COMPARISON SHOPPING AND PURCHASES

(75) Inventor: Eric J. Christensen, Ross, CA (US)

(73) Assignee: Farecast, Inc., Seattle, WA (US)

( * ) Notice: Subject to any disclaimer, the term of this patent is extended or adjusted under 35 U.S.C. 154(b) by 1062 days.

(21) Appl. No.: 11/109,209

(22) Filed: Apr. 18, 2005

(65) Prior Publication Data

US 2006/0161480 A1 Jul. 20, 2006

Related U.S. Application Data

(60) Provisional application No. 60/645,845, filed on Jan. 20, 2005.

(51) Int. Cl.
*G06Q 30/00* (2006.01)
(52) U.S. Cl. .................. 705/26; 705/5; 705/27
(58) Field of Classification Search ............. 705/5, 705/6, 26, 27
See application file for complete search history.

(56) References Cited

U.S. PATENT DOCUMENTS

| | | | | |
|---|---|---|---|---|
| 5,832,452 | A * | 11/1998 | Schneider et al. ............... | 705/5 |
| 6,076,070 | A * | 6/2000 | Stack ........................... | 705/20 |
| 7,076,451 | B1 * | 7/2006 | Coupland et al. .............. | 705/26 |
| 2002/0082877 | A1 * | 6/2002 | Schiff et al. ................... | 705/5 |
| 2003/0004760 | A1 * | 1/2003 | Schiff et al. ................... | 705/5 |
| 2003/0187705 | A1 | 10/2003 | Schiff et al. | |
| 2005/0033616 | A1 * | 2/2005 | Vavul et al. .................... | 705/5 |
| 2005/0154620 | A1 * | 7/2005 | Hentschel et al. .............. | 705/5 |
| 2005/0197893 | A1 * | 9/2005 | Landau et al. ................ | 705/14 |
| 2006/0116901 | A1 * | 6/2006 | Ookubo et al. ................. | 705/1 |
| 2006/0129463 | A1 * | 6/2006 | Zicherman .................... | 705/26 |
| 2006/0173753 | A1 * | 8/2006 | Padmanabhan et al. ....... | 705/27 |
| 2007/0226084 | A1 * | 9/2007 | Cowles ........................ | 705/27 |

OTHER PUBLICATIONS

Bly, L., "Comparison-Shopping Tools Lure Travelers," USA Today, Oct. 17, 2003.*
Anon., "NexTag Launches ServicesShopping(SM) with Comparison Shopping for Mortgages, Travel, Cars, Real Estate and Education," PR Newswire, Oct. 25, 2004.*
Richtel, M., "Man Emerges, Still Breathing, After E-Cave Confinement," New York Times, Final Edition, p. 33, col. 1, Sep. 22, 1999.*
Anon., "Women Outpace Men in Cell Phone Ownership, but Men Are More Fanatic About PDAs," Business Wire, Mar. 1, 2001.*
PCT International Search Report and Written Opinion, PCT/US06/02136, Aug. 17, 2007, 8 pages.

* cited by examiner

*Primary Examiner*—Nicholas D Rosen
(74) *Attorney, Agent, or Firm*—Perkins Coie LLP

(57) ABSTRACT

A system for comparing terms to describe a transaction. The system receives, for a plurality of sellers of a time sensitive fixed capacity non-physical goods, a plurality of purchase information describing a transaction associated with each of the plurality of sellers, the purchase information comprising list price, taxes, and purchase terms. The system aggregates the plurality of purchase information in a database and standardizes a first purchase information and a second purchase information in response to a query for the first purchase information for a seller of non-physical goods. In addition, the system displays for substantially simultaneous viewing the standardized first purchase information with the second purchase information.

25 Claims, 7 Drawing Sheets

SearchParty – Microsoft Internet Explorer provided by WorldRes

File  Edit  View  Favorites  Tools  Help

If you've already found a price for a hotel on another web site, enter that information below and we'll compare that price against our data for more than 100 other travel web sites.

Hotel Name [Type the hotel name here] [Find this Hotel]

Or select from below:

City [Select a City ▾]

Hotel Name [Select a Hotel ▾]

Room Type [Select a Room Type ▾]

Check-In Date [21 ▾] [Nov 2004 ▾] 🗓

Check-Out Date [24 ▾] [Nov 2004 ▾] 🗓

← from 230

Now, please fill in the information below, and then click on Compare It!
We'll see if we can find a better price for you.

|  | Nov. 21 | Nov. 22 | Nov. 23 |
|---|---|---|---|
| Nightly Rate | [ ] | [ ] | [ ] |
| Taxes / Fees | [ ] | [ ] | [ ] |

[Compare It!]

*FIG. 2A*

METHOD AND SYSTEM FOR AGGREGATING, STANDARDIZING AND PRESENTING PURCHASE INFORMATION FROM SHOPPERS AND SELLERS TO FACILITATE COMPARISON SHOPPING AND PURCHASES

CROSS REFERENCE TO RELATED APPLICATIONS

This application claims priority under 35 USC § 119(e) to U.S. Provisional Patent Application No. 60/645,845, titled "Method And System For Aggregating, Standardizing And Displaying Product Purchase Information From Different Shoppers And Sellers To Facilitate Comparison Shopping And Purchases", filed on Jan. 20, 2005, the contents of which are herein incorporated by reference.

BACKGROUND OF THE INVENTION

1. Field of the Invention

The invention relates generally to online search and electronic commerce, and more specifically, to comparison shopping of pricing and other purchase information regarding non-physical, time-sensitive, fixed-capacity goods, e.g., airline seats, hotel rooms, rental cars, and events, as well as presentation, e.g., display, of same.

2. Description of the Related Art

The pricing of various products can differ significantly depending upon where and how those products are purchased. Even if a consumer shopping online is looking at exactly the same product, the pricing and purchase terms for that product will often vary significantly depending upon where and how the product is purchased.

This is especially true for non-physical goods and services, including fixed-capacity, time-sensitive items such as airline seats, hotel rooms, rental cars, sporting events and concerts. These 'perishable capacity' items have high fixed costs, low variable costs, and minimal residual value if the capacity is not used by the set date and time. In order to maximize sales before the capacity perishes, sellers of these items often market and allocate capacity through many different distribution channels, and give distributors the ability to discount or mark up prices. This results in prices and purchase terms that usually vary significantly across, different merchants' web sites, and vary from the pricing and purchase terms offered by the supplier on their own web site.

For example, an online shopper may find that the price for the same hotel room on the same date will vary by 50-100% depending upon which web site the shopper uses to reserve or purchase the hotel room. The hotel may give certain web sites particularly attractive prices in order to get premium placement and more sales. In addition, different sites will set different cancellation policies for the same room on the same date.

Information on perishable capacity goods can be divided into product information and purchase information. Product information is fairly static, and is consistent across different online merchants and suppliers. For perishable capacity goods, examples of product information would be a seat on a specific scheduled flight, a hotel room on a specific night, or a concert seat on a certain evening. For a hotel room, detailed product information might include the hotel name, address, description and room types.

While product information is consistent, purchase information usually varies significantly from web site to web site. The same airline seat on the same flight may be purchased in many different combinations of price, cancellation penalties, and frequent flyer points. In the case of a hotel room, detailed purchase information includes pricing, cancellation/return policies, taxes and fees, payment process, frequent guest points, promotions/rewards, etc. As a result, even if a shopper knows the product they want to purchase, they may still need to go to many different web sites to find the purchase terms that fit them best and provide the most value before they decide where and how they will buy that product.

Shoppers could be better served if they could view in one place purchase information aggregated from a wide variety of sellers, especially if this information is standardized for shoppers to they can easily make side-by-side comparisons. Shoppers could then easily find the combination of pricing and other purchase terms that would specifically suit their needs, and they would be pointed to the web site where they could obtain those terms and complete their purchase.

Comparison shopping web sites have aggregated purchase information for various physically-delivered goods, such as cameras, DVDs, and other electronics. However, it is much more difficult for comparison shopping sites to aggregate purchase information on perishable capacity goods, such as travel and events, for several reasons. First, pricing and cancellation terms change constantly, partly due to yield management systems that adjust pricing dynamically depending upon demand, making it difficult for any aggregator to maintain and display updated, comprehensive data. Second, suppliers have struck a wide range of deals with resellers, or 'merchants', who will often set their own pricing, cancellation policies and other purchase terms. For example, sites define and display these terms differently, in a non-standard way, making it very hard to compare terms across different sites. Likewise, it is difficult to compare the prices and purchase terms side-by-side without going from site to site.

Third, some major online travel merchants and suppliers are unwilling to participate voluntarily in comparison shopping services. The omission of these major brands would be noticeable for shoppers, reducing their confidence in the service's comprehensiveness.

Various aggregators have tried different solutions to provide shoppers with aggregated purchase information for travel and other non-physical goods. However, these services have not solved the problems listed above: they do not aggregate information from a sufficient number of sites; they do not compare and display detailed purchase terms, such as taxes/fees, cancellation policies and payment terms; they don't standardize purchase terms for comparison; and they don't include information on all the major merchants and suppliers.

Hence, there is a need for a system and a method for collecting, normalizing, and presenting data for non-physical, time-sensitive, fixed-capacity goods for ease of comparison and/or other analysis.

SUMMARY OF THE INVENTION

One embodiment of the present invention includes information from merchants and suppliers, including information submitted by shoppers using the invention. Shoppers in one embodiment can input merchants' purchase information into a system in accordance with the present invention and then have this information compared against purchase information the system has received from other shoppers, as well as directly from other merchants and suppliers.

An embodiment of the present invention also aggregates, standardizes and displays purchase information that shoppers otherwise would find very difficult to compare across different merchants and suppliers. This purchase information includes items such as taxes and fees, cancellation policies, payment terms, and other terms are defined and displayed differently from seller to seller. An embodiment also maps this purchase information to a data model with standard terms that are then displayed side-by-side to facilitate comparison.

One embodiment of the present invention also includes comprehensiveness of merchants and suppliers, and the depth of purchase information aggregated, standardized and displayed, allows shoppers to easily find the combination of pricing and purchase terms that suit their specific needs. Shoppers can then simply click through to that merchant or supplier to complete their purchase.

A system and a process in accordance with the present invention also adds value for merchants and suppliers by providing them with an efficient means for reaching highly-qualified prospective buyers. For example, the system and the process can help qualify shoppers as prospective buyers by presenting them with comprehensive, in-depth purchase information from different merchants and suppliers. This allows the shopper to pick the purchase terms that suit them best, and then click through to that merchant or supplier to make a purchase. As a result, the qualified shopper that arrives on the merchant's or supplier's site is much more likely to make a purchase, and therefore can be more valuable traffic for that merchant or supplier. The system and the process can also help match shoppers with merchants and/or suppliers based on detailed, standardized purchase terms, and therefore creates a more efficient and valuable marketplace for introducing both parties to each other.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. ("FIG.") 1 is a flow diagram illustrating a summary level overview of the system and methods.

FIG. 2A is an illustration of the application users would download to their computer and deploy to help them contribute purchase data to the system during their shopping and obtain comparisons.

DETAILED DESCRIPTION OF THE PREFERRED EMBODIMENTS

Figure 1:
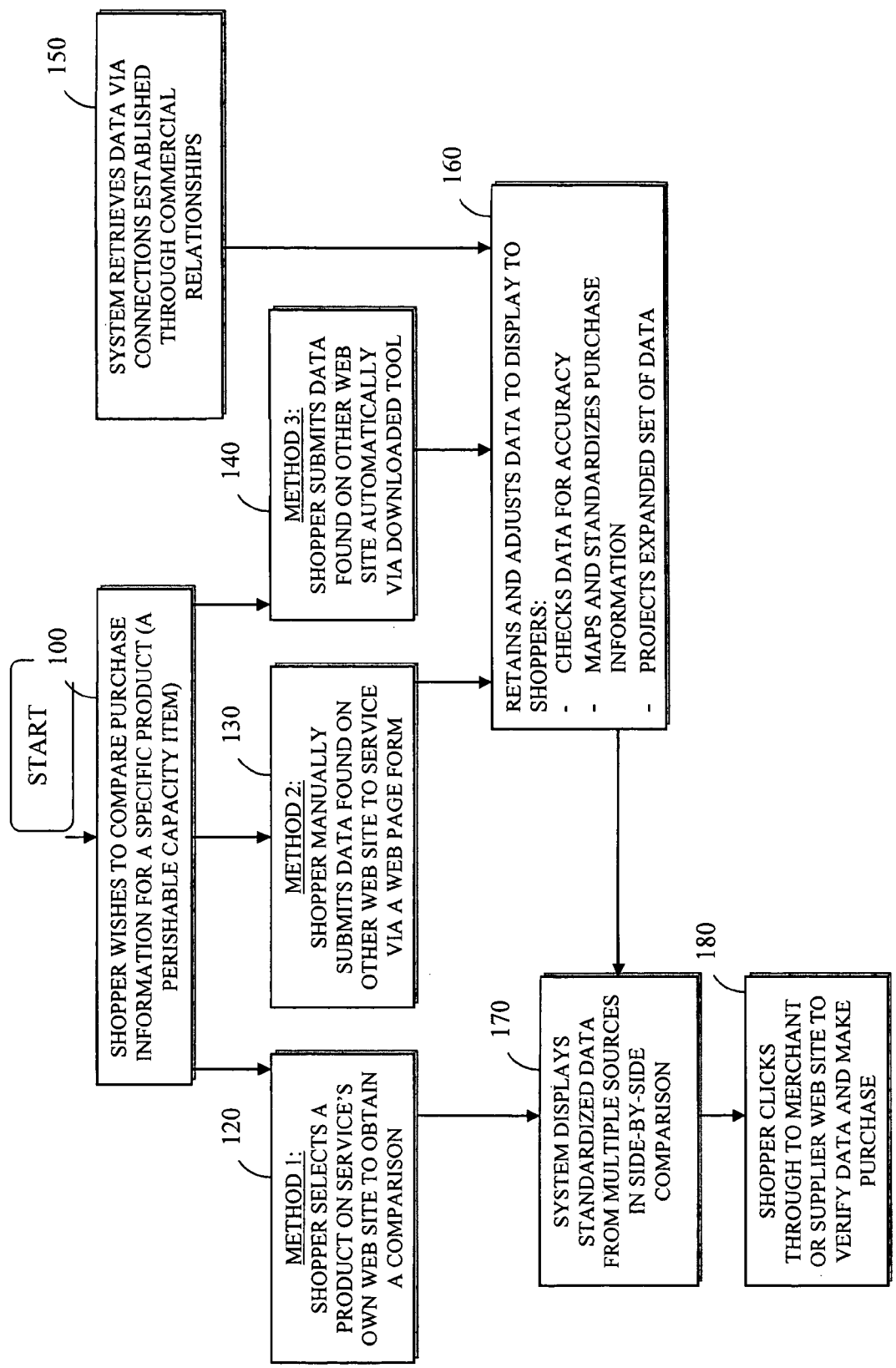

The Figures ("FIGS.") and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

An embodiment of a system (and a method) is disclosed for aggregating purchase data from shoppers, merchants and suppliers, and then standardizing, sharing and displaying this data to shoppers to facilitate comparison shopping in accordance with the present invention. In one embodiment, a system is configured to help shoppers evaluate and compare different purchase information for acquiring the same perishable capacity items from different merchants and suppliers. This purchase information includes pricing, as well as other purchase terms such as surcharges (e.g., taxes, fees, shipping), cancellation or return policies, payment policies, discounts, rebates, promotions, loyalty incentive awards, and extra items included with the purchase (e.g. free breakfast with room).

The system includes a database for maintaining both product information and purchase information. The product information is relatively static and consistent across different merchants and suppliers. As an example, the detailed product information for hotels might include the hotel name, address, room types, photographs and lists of amenities. The purchase information, as described above, will generally vary across different merchants and suppliers, even for the same product.

The system also aggregates the purchase information, including a specific method for aggregating data from shoppers themselves. Shoppers that are interested in comparing purchase terms for products they see online will submit the specific product and purchase information they have found to a central database, which then displays their information alongside comparable purchase information from other sellers of the same product. This allows the shopper to possibly find purchase terms that may be more suitable or preferable. The product and purchase information submitted by the shopper then becomes part of the central database, and becomes available for display to other shoppers who may also be interested in purchasing the same product.

FIG. 1 is a flow diagram illustrating a summary level overview of a system and a method in accordance with the present invention. Shoppers seeking 100 a comparison for purchase data may obtain this comparison from the service via different processes, for example, as noted below.

In a first embodiment, shoppers go 120 to the service's own web site, or a 'private label' version of that web site co-produced with a third party, and select a product based on the product information. In the case of a hotel, the shopper may select a city and check-in/check-out dates, and then select a specific hotel and room type. Once the product is selected, the shopper hits a button to request a comparison of purchase information from different merchants and suppliers that sell that product. The service returns 170 a display of purchase information from different merchants and suppliers in a side-by-side format. This information would come from the service's database cache and from its real-time connections to merchants and suppliers. This first method is illustrated in more detail in FIG. 5.

In a second embodiment, the shopper sees product and purchase information on a third-party web site, and wishes to compare that purchase information against purchase information from other merchant and supplier web sites for that same product. The shopper goes 130 to a specific page on the service's web site and manually enters into a form the product and purchase information found on the third-party web site. The shopper then hits a button on the form to submit this data to the service and request a comparison of this data against purchase information from other merchants and suppliers. The service returns 170 a display of the submitted information and other purchase information in a side-by-side format. The information submitted by the shopper is then retained 160 in the service's database for possible display to other shoppers requesting comparisons for the same product. This second method is illustrated in more detail in FIG. 2A.

In a third embodiment, the shopper first downloads an application from the service's web site. This application automates the process of submitting product and purchase information from third party web sites. The application automatically detects when the shopper is visiting a web site that offers products compared by the service, and which can be mapped to the product and purchase information in the service's database. When a shopper visits one of these sites, the application automatically opens 140 another window in the shopper's browser. Through this window, the service communicates with the shopper and tells them if the service can provide a comparison for the product the user is viewing through the browser. If the service can provide a comparison, the shopper can hit a button in the window to submit to the service the product and purchase information displayed in the web browser, and request and obtain a comparison of this purchase information against information from other sites. This third method simply automates for the shopper the same process as described above for the second method 140. This third method is illustrated in more detail in FIG. 2B.

The service retains 160 the data submitted by shoppers for the purpose of storing this data, mapping and standardizing it, and then displaying it later to other users for comparison purposes. In this manner, users contribute to and share from a combined set of data. The service also obtains data 150 through commercial relationships from merchants and suppliers. This data may be obtained on a real-time basis when requested by users, or it may be obtained on an intermittent basis to update the cached data in the database. An embodiment of this process for aggregating data is illustrated in more detail in FIG. 3.

The data submitted to and obtained by the service is then mapped 160 to a common data model to standardize 160 the data and display 170 a set of consistent purchase terms that can be more easily understood by shoppers. Displaying 170 a set of mapped, consistent purchase terms, in a side-by-side manner, facilitates direct comparisons between non-standard purchase terms displayed on different web sites. An embodiment of the processes of evaluating the submitted data, standardizing it, and extrapolating from it, are illustrated in more detail in FIG. 4.

The service provides 170 shoppers a side-by-side comparison of purchase information from different merchants and suppliers. The shopper can then click through 180 directly to the merchant or supplier's web site to verify the purchase terms and complete the purchase. An embodiment of the comparison display is illustrated in more detail in FIG. 5.

Figure 2:
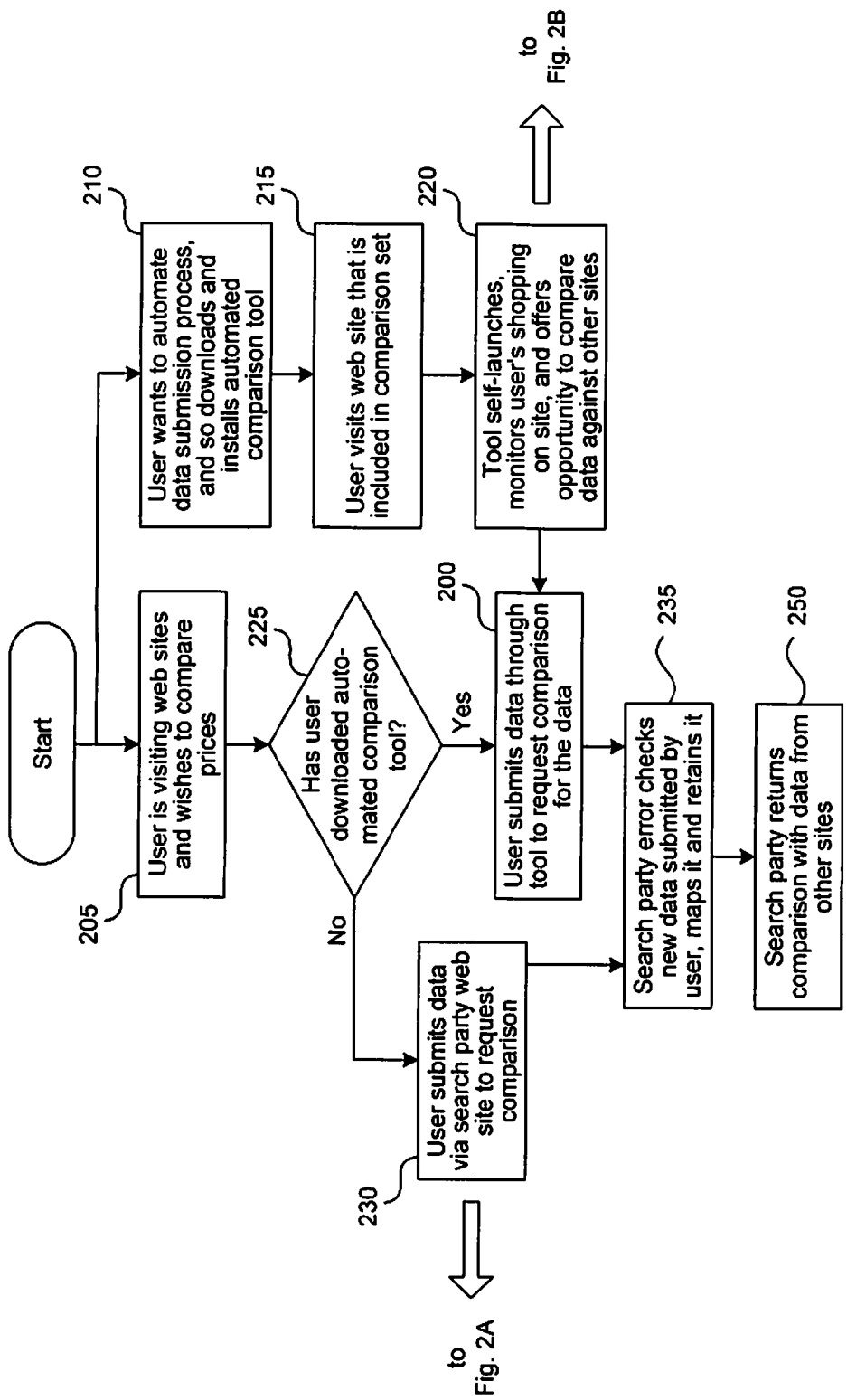
FIG. 2 is a flow diagram illustrating how individual users of the service would contribute purchase information to the system, to be shared with and displayed to other users.
Figure 2B:
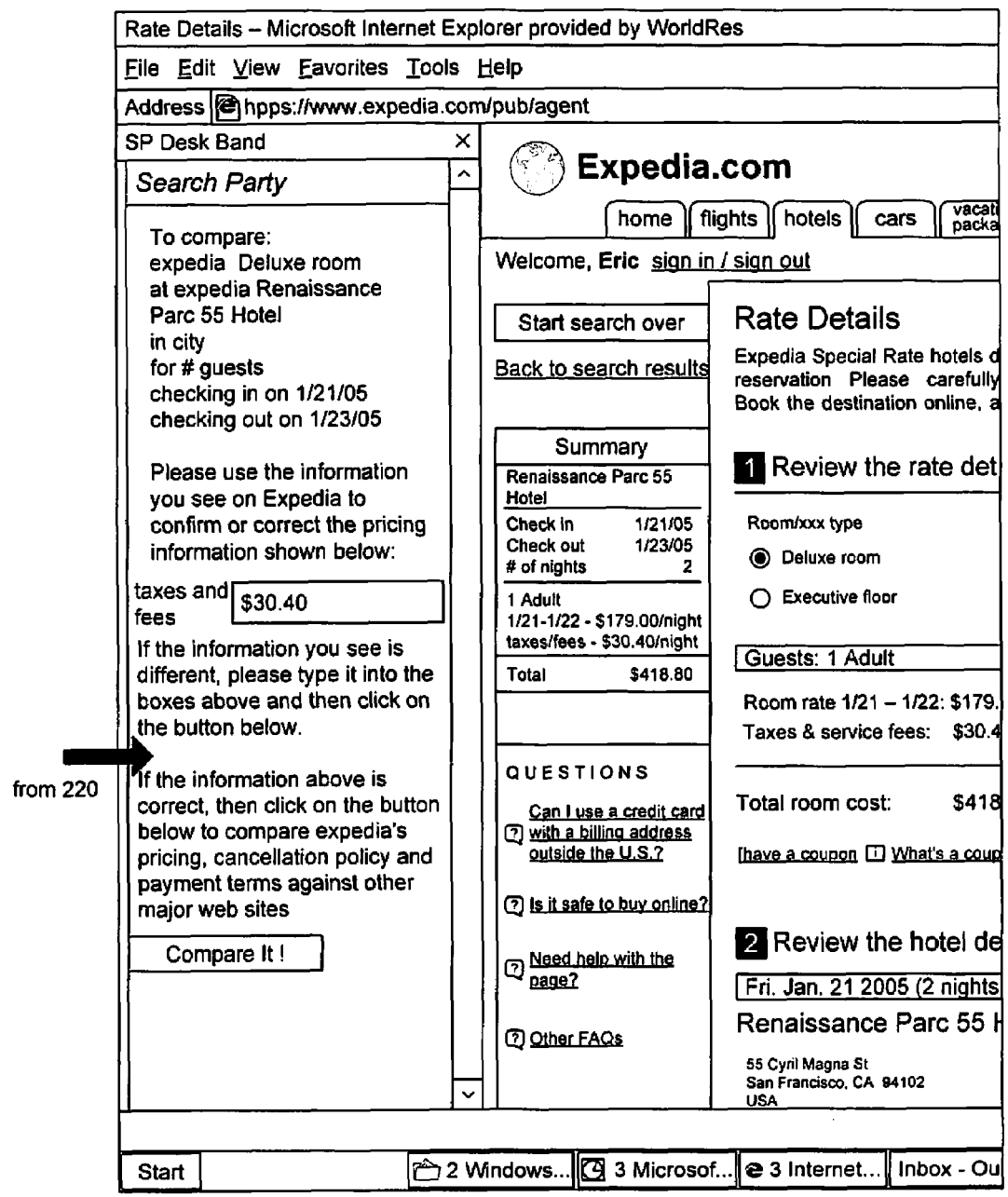
FIG. 2B is an illustration of a web page where users could enter product and purchase information found on a third-party web site and request a comparison from the system.

FIG. 2 is a detailed flow diagram illustrating how individual users of the service contribute purchase information to the system, to be shared with and displayed to other users. The diagram illustrates the second and third methods for shoppers to submit their product and purchase information to the central database for comparison.

In this embodiment, using the second method, if a shopper has already found product and purchase terms on another web site, the shopper can obtain a comparison by manually inputting 230 those terms into a form FIG. 2A the service offers on its web site. When the user submits 230 this information to be compared, the submitted information is sent to a central database. The service maps this data against product and purchase information from other web sites.

Simultaneously (or substantially simultaneously), the system retains 235 the data submitted by the shopper in the central database in order to be available to be displayed to other shoppers looking to obtain comparisons of purchase terms for the same product. The system then displays 250 (also, e.g., FIG. 5A) the submitted data alongside purchase data from other web sites for comparison. The shopper can then compare the purchase terms they found and submitted against other purchase terms in the database for the same product, but from different merchants and suppliers.

As an example, assume a shopper has found 205 on www.hotels.com a price for a standard room at a Holiday Inn in Chicago, checking in on November $1^{st}$ and checking out on November $3^{rd}$, and the price is $110 per night plus $10 for taxes and fees. The shopper can then go to the service's web site and click 230 on a link to obtain a form to input this product and purchase information. The user could select FIG. 2A "Chicago" and "Holiday Inn" from a list of choices to find the right product. They could then input the check-in and check-out dates, select "standard room", and input the price and tax information.

Finally, the user could select hotels.com from a list of possible merchants and suppliers. The user then hits a "submit" button on this form, and the service would then return FIG. 5A a new window showing the hotels.com purchase information alongside purchase information for the same product from other merchants and suppliers in a side-by-side format. For an item such as cancellation policies, even if the hotels.com cancellation information is not submitted by the user, the service may suggest what it believes the cancellation policy is on hotels.com for that product based on past experience with hotels.com.

More frequent users of the service may want to utilize the third method for obtaining comparisons, which automates the process of submitting information found on third party web sites. The user starts by clicking on a link on the service's web site to download 210 and install an automated comparison tool on the user's computer. Once installed, the tool works with the shopper's web browser to monitor web sites visited 215 by the user.

The tool self-launches 220 if the shopper visits a web site that is among the web sites covered and compared by the service. The tool then launches 220 (and, e.g., FIG. 2B) in a side window of the shopper's browser. The tool monitors the shopper's searching and shopping on that web site to see if the product and purchase information being viewed by that shopper can be compared by the service against purchase information from other merchants and suppliers. If a comparison is available, the service provides the shopper with a button in the window to submit 200 the displayed product and purchase information and obtain the comparison.

The original information submitted by the shopper is retained 235 and 345 in the database. The submitted information is checked and mapped against other information. The service then displays 235 a new browser window containing the requested comparison of purchase information. The original information submitted by the shopper is then available to be displayed to other shoppers that query the central database.

Figure 3:
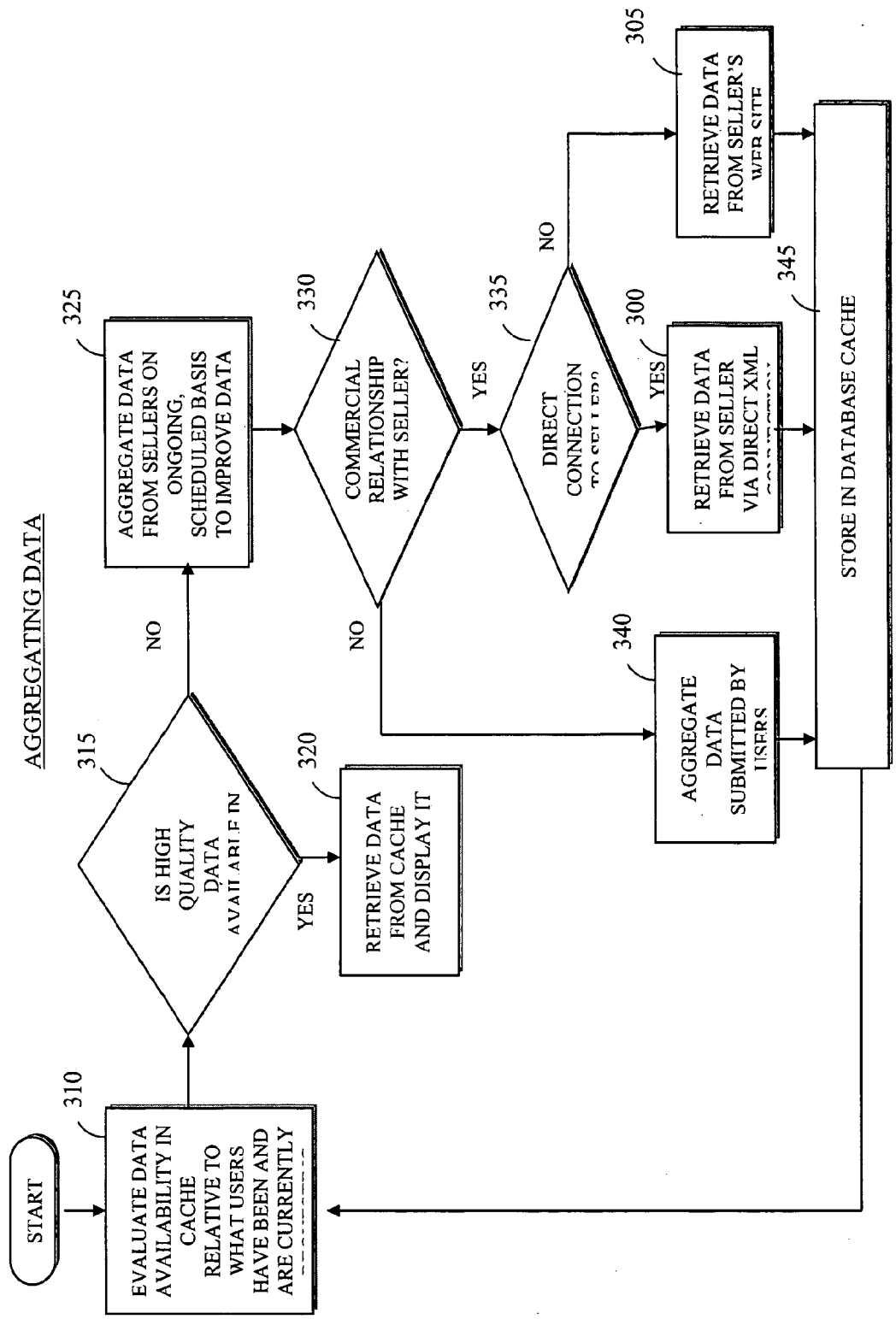
FIG. 3 is a flow diagram illustrating how the system would aggregate additional purchase data directly from merchants and suppliers.

FIG. 3 illustrates an embodiment of how additional data is aggregated into the central base directly from merchants and suppliers through commercial agreements in accordance with the present invention. The system includes a central database 345 that includes product information. As an example, for a hotel this would include the hotel address, description, amenities and photos. This information is relatively static and is generally available from merchants and suppliers.

The database 345 also includes purchase information, which is dynamic. As an example, for a hotel, detailed purchase information would include room availability, pricing, taxes and fees, cancellation policies, and payment policies. This information is aggregated and stored in the central database. Purchase information for perishable capacity items changes constantly, so this information must be refreshed frequently in order to remain accurate. As an example, a merchant may show on Monday that it has rooms at a specific hotel for Saturday at $100 per night. However, as the merchant sells more rooms, it may increase its price to $120 per night. By Wednesday, it may not have any more rooms available. Therefore, it is necessary to obtain 325 updated information from this merchant, as well as from other merchants and suppliers on an ongoing basis.

As purchase information is aggregated, the system evaluates 315 patterns to understand how often the information has changed historically. These patterns are then evaluated 310 against the inflow of new data to determine whether the new information submitted to the system is sufficient enough and recent enough in order to be accurate against what a user would see by going directly to that merchant's or supplier's web site. As an example, the system may note that a certain merchant or supplier rarely changes its prices for hotel rooms more than two weeks before the date of stay. If the system has obtained a price of $200 three weeks out, it may not need to update that price for another week, and assume the price will remain unchanged until then.

It is noted that the system may be configured to constantly monitor incoming data vs. historical data patterns to determine the system's relative confidence level in the accuracy of its cached information. Aggregation of additional information is scheduled 325 and implemented in a manner to achieve desired accuracy levels within statistically determined confidence levels. This control avoids requesting too much unnecessary data, which can tax the merchants' and suppliers' data systems. If the system has sufficient information to have a high degree of confidence in that information's accuracy, then the system will display that information 500 to shoppers. If the system does not have sufficient information to be accurate, then the system will aggregate 300 additional information wherever it has a direct commercial relationship 335.

The system may also predict 435 additional information based on historical patterns in order to increase the information available for display. As an example, if a price of $200 is obtained for a hotel room three weeks before check-in, the system may infer that the same price applies to that room for check-in dates between two and three weeks out.

If a user is making a specific request for information, and the system has a direct, real-time connection to the source of that information, the system will query 300 and display that information on a real-time basis. This information obtained on a real-time basis will also then be stored 345 in the cache. Real-time connections are generally made via direct XML-based interfaces to the merchant's or supplier's system.

If there is no direct connection, the system may query 305 the merchant or supplier's web site. If this information can be aggregated quickly enough, it will be obtained and displayed on a real-time basis when the user requests it. If the information can not be obtained 305 quickly enough from the web site, the system will query the web site on an ongoing, intermittent basis, as determined by the system scheduler 325 (e.g., predetermined, preprogrammed, or otherwise timed in some interval) in order to have sufficient information in the cache. If there is no commercial relationship with the merchant or supplier, then the system can be configured to pull (or extract) information from the cache 345 that has been previously submitted 340 (and, e.g., 200 and 230) by other users.

Quality assurance managers will also evaluate the quality of cached information from time to time by checking the data against the merchant or supplier's web site. By verifying the accuracy or inaccuracy of cached information, quality assurance managers help establish the quality of cached information, which in turn is used to adjust the scheduler 325 to obtain the information needed to improve quality.

Figure 4:
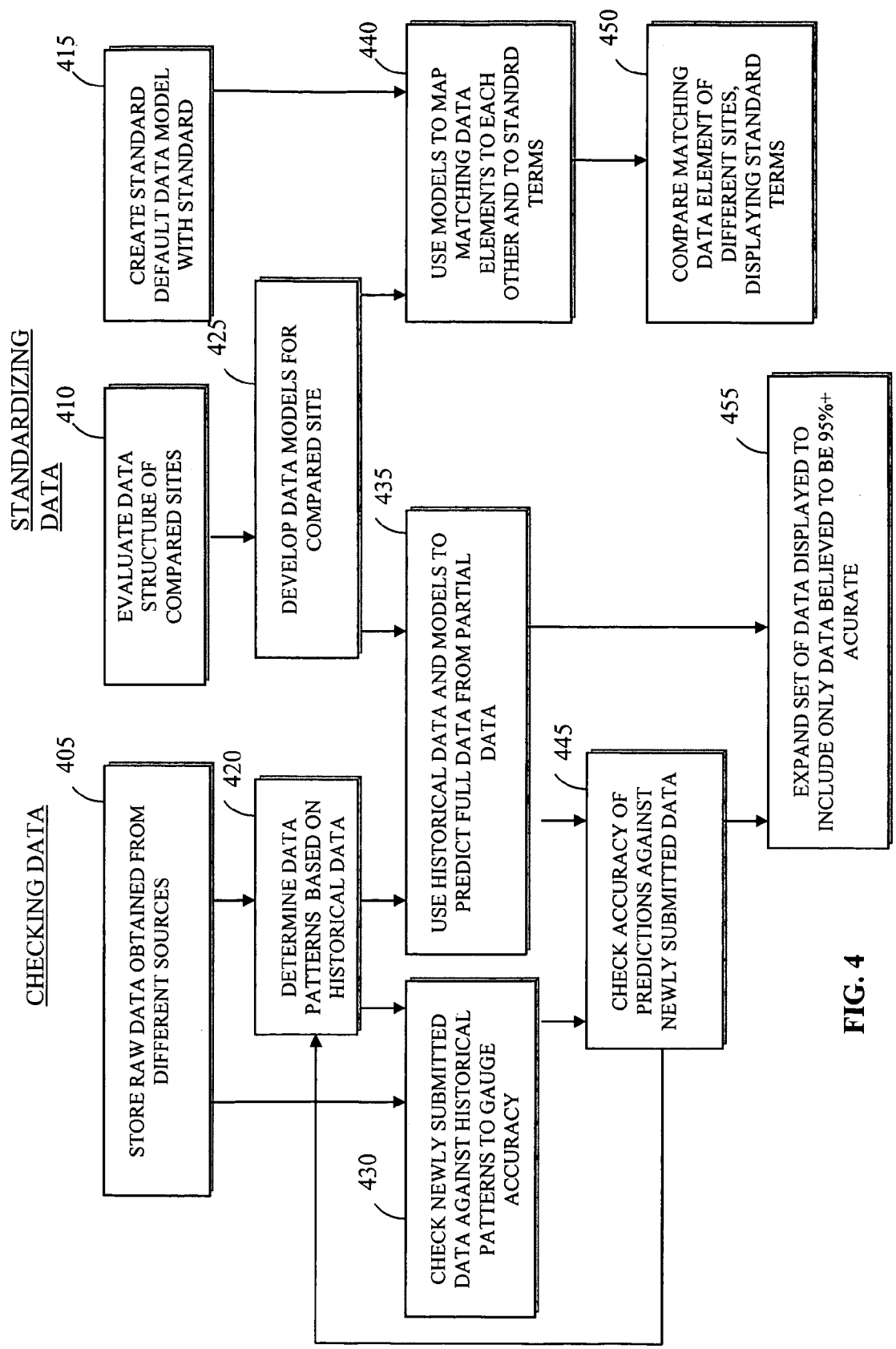
FIG. 4 is a block diagram illustrating the methods and processes used on the data to check accuracy, map against other data (for comparison purposes), map non-standard data to standard terms, and project additional data based on historical data and models.

FIG. 4 illustrates an embodiment of methods and processes used on the data to check accuracy, map against other data (for comparison purposes), map non-standard data to standard terms, and project additional data based on historical data and models in accordance with the present invention. First, the system checks 430 incoming data and projects 435 additional data based on historical patterns. For example, will the taxes and fees for a certain product be consistent from day to day, or will they change? Do the cancellation policies ever change for a product, and if so, when? These patterns can be established 420 from historical data, and they allow the system to infer 435 additional information beyond what has been submitted by users or obtained from merchants and suppliers. As a further example, if the price for a certain product—such as specific hotel room checking in on a certain date—has not changed recently, it is likely that the price for the same hotel room checking in on the following day has also not changed.

It is noted that the system evaluation process monitors predetermined activity over a period of time for storage and use with respect to future evaluations. Further, patterns are continually re-evaluated 445 based on additional incoming information, and additional checks by quality assurance managers. The system constantly evaluates its confidence level of predicted information and filters the information it displays to only show the information that is predicted 455 with a certain confidence level (e.g. 95% confidence).

The system also standardizes (or normalizes) data. Much of the purchase information aggregated from different sources is non-standard: merchants may use different names for products, or they will structure their cancellation policies differently. As an example, a merchant may call a certain hotel room type a "standard" room, while the supplier may call the same room type a "King Bedded" room, even though both are selling exactly the same room. The system evaluates 410 different data models (further described below) used on the merchant and supplier web sites to determine how each merchant or supplier structures its data.

As noted previously, a data model 425 can be established for each merchant and supplier. The data model comprises a business model of how a hotel sells data so that extracted data for comparison can be appropriately configured with respect to like fields or data. It is noted that the system may be populated with predetermined data models, e.g., data models for the top 10 hotels frequented by a particular demographic. As more data is gathered over time with respect to particular hotels, the existing data models can be updated or new data models can be created and stored. The data models may be created manually, e.g., entering in specific data for a particular hotel, or automated, e.g., using data extraction and statistical modeling to identify how a hotel conducts its business and presents its data.

The system then establishes 415 a set of standard purchase information terms. As an example, one hotel merchant may allow cancellations "48 hours prior to arrival", while another may allow cancellations "up to 2 days prior to the specific check-in date". The system would map both terms to a standard term of "2 days prior to arrival" and display this standard term for both to facilitate comparisons. Another example could be two merchants that describe their payment policies differently, but both can be mapped accurately to one standard payment term of "Your credit card will be charged the full amount at the time of booking." The data models of merchants and suppliers are then mapped 440 to these standard terms. The system then displays 450 only these standard terms, which are consistent and more easily understood by shoppers.

Figures 5, 5A:
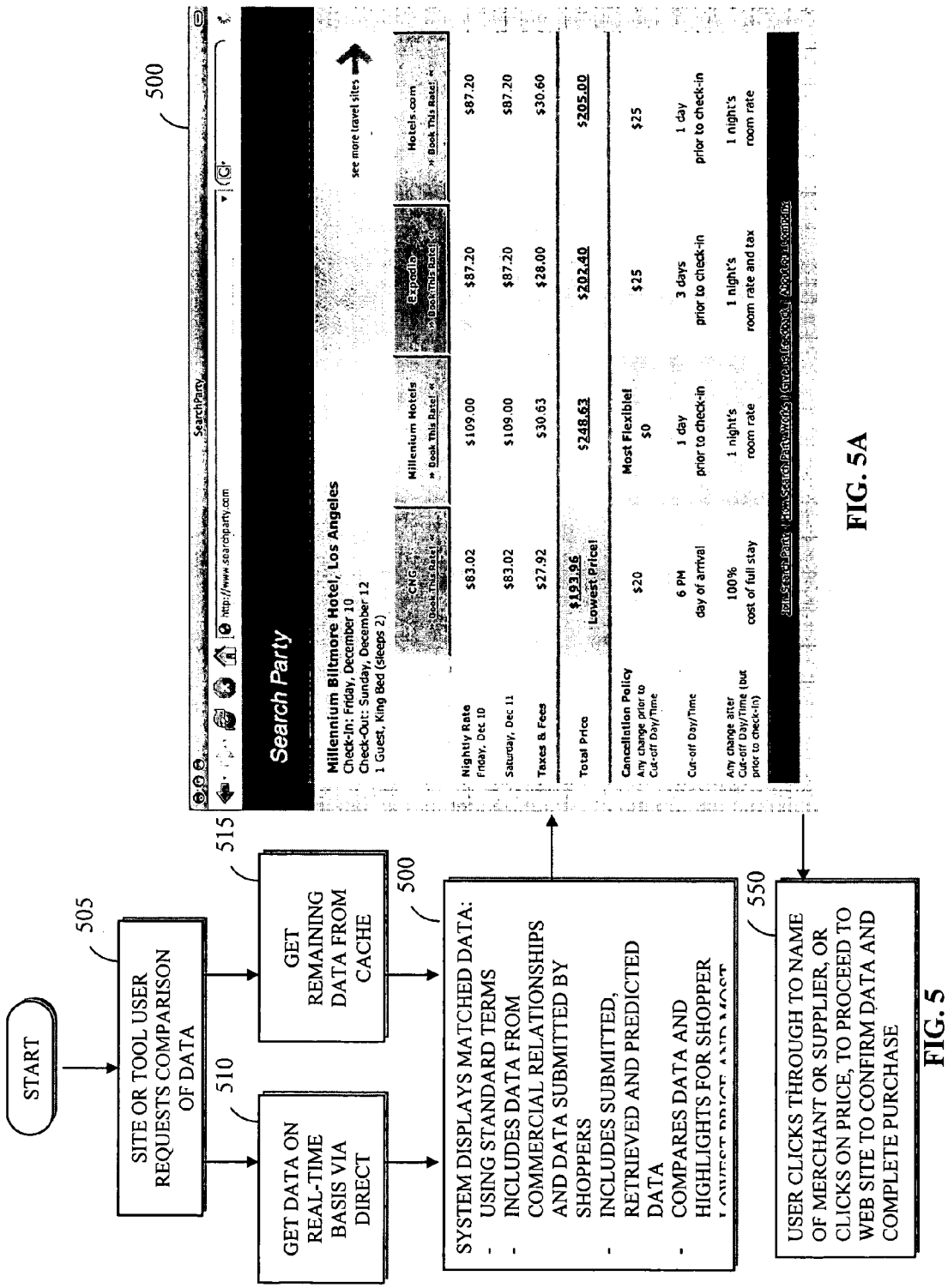
FIG. 5 is a flow diagram illustrating how the mapped and standardized data would be displayed to shoppers, upon their request, to facilitate comparison shopping and purchase decisions.
FIG. 5A is an illustration showing how the service displays mapped, standardized data in a side-by-side format to facilitate comparisons.

FIG. 5 illustrates how the standard, consistent purchase terms would be displayed to shoppers, upon their request 505, to facilitate comparison shopping and purchase decisions. Shoppers request the data any time they seek to compare purchase information terms for a specific product across different merchants and suppliers. When they request this information from the system, some information will be aggregated on a real-time basis via direct connections to merchants' and suppliers' systems 510. If that is not possible, information will be pulled and displayed from cache 515. The comparison request may be made via any one of the three methods (120, 130 and 140) illustrated in FIG. 1.

The system displays purchase information using standardized terms, and on a side-by-side basis 500. The display is unique in both its breadth and depth. The display 500 has a large breadth of merchants and suppliers, including those where the data was submitted by shoppers. This purchase information can be included because it was submitted by users who visited these sites. The display 500 also has a unique depth of purchase information, including pricing, taxes and fees, cancellation policies and payment policies. In addition, this information is all displayed using standard terms, as the non-standard information from multiple merchants and suppliers has been mapped to a standard set of terms. Finally, the system also compares 500 the different purchase terms and highlights 500 for the shopper the best terms, such as the lowest price and the most flexible cancellation policy.

It is noted that the information may be displayed in a variety of formats on the screen. For example, most relevant information (e.g., least expensive overall or most perks) may be displayed above the fold of a web site screen. Likewise, the information may be displayed so that all the information can be auto formatted to fit within a full screen view (e.g., by altering font size and/or modifying column and/or row size). In each instance, the completeness and depth of information can be maintained so that a user can have an as true as possible view of data that allows for comparison of non-physical, time-sensitive, fixed-capacity goods.

Embodiments of the present invention may be storable as instructions on a computer readable medium (e.g., a memory, a storage device, and the like) and would be executable on a processing device (e.g., a processor, controller, state machine or application specific integrated circuit configured to execute instructions). In addition, embodiments of the present invention may be hosted on a computer network (e.g., the Internet or Internet2) with access for users through a web site. The user may access the web site through a computing system (e.g., a personal computer, laptop computer, personal digital assistant, a handheld computer, a cellular phone that allows data communication, etc.) having a wired or wireless network connection, an appropriate operating system, and appropriate application software to access the web site (e.g., a web browser). Alternative embodiments of the present invention may include a downloadable program for the computing system (e.g., an applet), which can also integrate functionality to upload or download data between it and the web site server without a need for web browser type application software.

Upon reading this disclosure, those of skill in the art will appreciate still additional alternative structural and functional designs for a system and a process for a system and a method for collecting, normalizing, and presenting data for non-physical, time-sensitive, fixed-capacity goods for ease of comparison and/or other analysis through the disclosed principles of the present invention. Moreover, although the examples provided herein were primarily directed to hotels, the principles disclosed may also be applicable to other non-physical, time-sensitive, fixed capacity goods that may be compared and analyzed such as vehicle (e.g., car, boat, snowmobiles, motorcycle, bicycles, etc.) rentals, theater tickets, movie tickets, event (e.g. concerts, lectures, etc.) tickets, cruises, airline tickets, vacation rentals properties, vacation packages, and the like.

Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method implemented by a comparison service for comparing terms to describe a transaction, the method comprising:

receiving, for a plurality of sellers of time sensitive fixed capacity non-physical goods, a plurality of purchase information describing a transaction associated with each of the plurality of sellers, the purchase information comprising list price, taxes, and purchase terms;

aggregating the plurality of purchase information in a database;

standardizing a first purchase information and a second purchase information in response to a query for the first purchase information for a seller of non-physical goods; and providing to a computer of a shopper the standardized first purchase information with the standardized second purchase information for display in a first window of a browser while simultaneously displaying in a second window of the browser a web page of a third-party web site that includes the first purchase information by downloading an application from a web site of the comparison service to the computer of the shopper, wherein the computer configured with the downloaded application:
    automatically detects when the shopper is visiting a third-party web site that offers goods compared by the comparison service;
    upon such automatic detecting and upon receiving from the shopper a request for comparison of purchase information relating to the first purchase information, submits to the comparison service a request to obtain purchase information relating to the first purchase information; and
    in response to submitting the request,
        receives from the comparison service the standardized first purchase information and the standardized second purchase information; and
        displays in the first window the standardized first purchase information and the standardized second purchase information.

2. The method of claim 1, wherein the purchase terms include payment terms.

3. The method of claim 1, wherein the purchase terms include cancellation terms.

4. The method of claim 1, wherein the purchase terms further includes promotion terms.

5. The method of claim 1, wherein the purchase terms includes user credit terms.

6. The method of claim 1, wherein the standardizing further comprises mapping the purchase information to a common data model.

7. The method of claim 1, wherein receiving further comprises receiving at least a portion of the purchase information directly from a seller of the plurality of sellers.

8. The method of claim 1, wherein receiving further comprises receiving at least a portion of the purchase information from a consumer of the plurality of sellers.

9. The method of claim 1, wherein the time sensitive fixed capacity non-physical goods include a hotel reservation.

10. The method of claim 1, wherein the time sensitive fixed capacity non-physical goods include one from a group consisting of a sporting event, a concert performance, and a theater performance.

11. The method of claim 1, wherein the time sensitive fixed capacity non-physical goods include one from a group consisting of a vehicle rental and airline tickets.

12. A method implemented by a comparison service for comparing terms associated with a transaction for hotel occupancy, the method comprising:
    receiving, for each of a plurality of information providers of hotel reservations, reservation information describing purchase information to purchase a hotel reservation from an information provider of hotel reservations of the plurality of hotel reservations, the purchase information comprising list price, taxes, and cancellation terms;
    aggregating, for each of the plurality of information providers of hotel reservations, the purchase information in a database;
    standardizing, in response to a query for a purchase information associated with an information provider of the plurality of information providers, the queried purchase information relative to at least one other purchase information in the database; and
    providing to a computer of a shopper the standardized queried purchase information and the at least one other purchase information for display in a first window of a browser while simultaneously displaying in a second window of the browser a web page of a third-party web site that includes the queried purchase information by downloading an application from a web site of the comparison service to the computer of the shopper, wherein the computer configured with the downloaded application:
        automatically detects when the shopper is visiting a third-party web site that offers goods compared by the comparison service;
        upon such automatic detecting, submits to the comparison service a request to obtain purchase information relating to the queried purchase information; and
        in response to submitting the request,
            receives the standardized queried purchase information and the standardized at least one other purchase information; and
            displays in the first window the standardized queried purchase information and the standardized at least one other purchase information.

13. The method of claim 12, wherein the purchase information further comprises promotion terms associated with the hotel reservation.

14. The method of claim 13, wherein the promotion terms comprise a discount of the list price.

15. The method of claim 13, wherein the promotion terms comprise travel award credit.

16. The method of claim 12, wherein the standardizing further comprises mapping the cancellation terms to a common data model.

17. The method of claim 16, wherein mapping the cancellation terms to the common data model comprises mapping non-standard data to standard terms.

18. The method of claim 12, wherein the standardizing further comprises projecting, from a historical data model, additional data corresponding to cancellation terms.

19. A computer readable medium storing instructions for execution by a processor of a comparison service, the instructions for comparing terms associated with a transaction for hotel occupancy, the instructions comprising:
    receiving, for each of a plurality of information providers of hotel reservations, reservation information describing purchase information to purchase a hotel reservation from an information provider of hotel reservations of the plurality of hotel reservations, the purchase information comprising list price, taxes, and cancellation terms;
    aggregating, for each of the plurality of information providers of hotel reservations, the purchase information in a database;
    standardizing, in response to a query for a purchase information associated with an information provider of the plurality of information providers, the queried purchase information relative to at least one other purchase information in the database; and
    providing to a computer of a shopper standardized queried purchase information and the at least one other purchase information for display in a first window of a browser while simultaneously displaying in a second window of the browser a web page of a third-party web site that includes the queried purchase information by downloading an application from a web site of the comparison service to the computer of the shopper, wherein the downloaded application:
        automatically detects when the shopper is visiting a third-party web site that offers goods compared by the comparison service;

upon such automatic detecting, submits to the comparison service a request to obtain purchase information relating to the queried purchase information; and in response to submitting the request, receives the standardized queried purchase information and the standardized at least one other purchase information; and displays in the first window the standardized queried purchase information and the standardized at least one other purchase information.

20. The computer readable medium of claim 19, wherein the purchase information further comprises promotion terms associated with the hotel reservation.

21. The computer readable medium of claim 20, wherein the promotion terms comprises a discount of the list price.

22. The computer readable medium of claim 20, wherein the promotion terms comprises travel award credit.

23. The computer readable medium of claim 19, wherein the standardizing further comprises mapping the purchase terms to a common data model.

24. The computer readable medium of claim 23, wherein mapping the cancellation terms to the common data model comprises mapping non-standard data to standard terms.

25. The computer readable medium of claim 19, wherein the standardizing further comprises projecting, from a historical data model, additional data corresponding to the cancellation terms.

* * * * *